US007624283B2

(12) United States Patent
Bade et al.

(10) Patent No.: US 7,624,283 B2
(45) Date of Patent: Nov. 24, 2009

(54) PROTOCOL FOR TRUSTED PLATFORM MODULE RECOVERY THROUGH CONTEXT CHECKPOINTING

(75) Inventors: Steven A. Bade, Georgetown, TX (US); Thomas J. Dewkett, Staatsburg, NY (US); Nia L. Kelley, Austin, TX (US); Siegfried Sutter, Boeblingen (DE); Helmut H. Weber, Dettenhausen (DE)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 11/352,762

(22) Filed: Feb. 13, 2006

(65) Prior Publication Data

US 2007/0192597 A1 Aug. 16, 2007

(51) Int. Cl.
*G06F 11/30* (2006.01)
*H04K 1/10* (2006.01)
(52) U.S. Cl. .................. 713/189; 713/150; 713/193; 713/194; 380/34
(58) Field of Classification Search .................. None
See application file for complete search history.

(56) References Cited

U.S. PATENT DOCUMENTS

| | | | |
|---|---|---|---|
| 6,279,046 B1 | 8/2001 | Armstrong et al. | |
| 6,690,400 B1 | 2/2004 | Moayyad et al. | |
| 6,971,002 B2 | 11/2005 | Austen et al. | |
| 7,114,051 B2 | 9/2006 | Guu et al. | |
| 7,127,585 B2 | 10/2006 | Shimada et al. | |
| 7,478,246 B2 * | 1/2009 | Arndt et al. ................. 713/189 | |
| 2003/0196083 A1 | 10/2003 | Grawrock et al. | |
| 2003/0229802 A1 | 12/2003 | Challener et al. | |
| 2004/0039924 A1 | 2/2004 | Baldwin et al. | |
| 2004/0158549 A1 | 8/2004 | Matena et al. | |
| 2004/0215948 A1 | 10/2004 | Abbey et al. | |

(Continued)

OTHER PUBLICATIONS

Frederic Stumpf, Claudia Eckert, "Enhancing Trusted Platform Modules with Hardware-based Virtualization Techniques", IEEE 2008, The Second International Conference on Emerging Security Information Systems and Technologies, pp. 1-9.*
U.S. Appl. No. 10/835,350, filed Apr. 29, 2004, Bade et al.
U.S. Appl. No. 10/835,330, filed Apr. 29, 2004, Bade et al.

*Primary Examiner*—Kaveh Abrishamkar
(74) *Attorney, Agent, or Firm*—Yee & Associates, P.C.; Casimer K. Salys

(57) ABSTRACT

A computer implemented method for recovering a partition context in the event of a system or hardware device failure. Upon receiving a command from a partition to modify context data in a trusted platform module (TPM) hardware device, a trusted platform module input/output host partition (TMPIOP) provides an encrypted copy of the context data and the command to the TPM hardware device, which processes the command and updates the context data. If the TPM hardware device successfully processes the command, the TMPIOP receives the updated context data from the TPM hardware device and stores the updated context data received in encrypted form in a context data cache or a non-volatile storage off-board the TPM hardware device. If the TPM hardware device fails to successfully process the command, the TMPIOP uses a last valid copy of the context data to retry processing of the command on a different TPM hardware device.

19 Claims, 8 Drawing Sheets

U.S. PATENT DOCUMENTS

2005/0033987 A1 2/2005 Yan et al.
2005/0055588 A1 3/2005 Nalawadi et al.
2005/0235141 A1 10/2005 Ibrahim et al.
2007/0067366 A1 3/2007 Landis

* cited by examiner

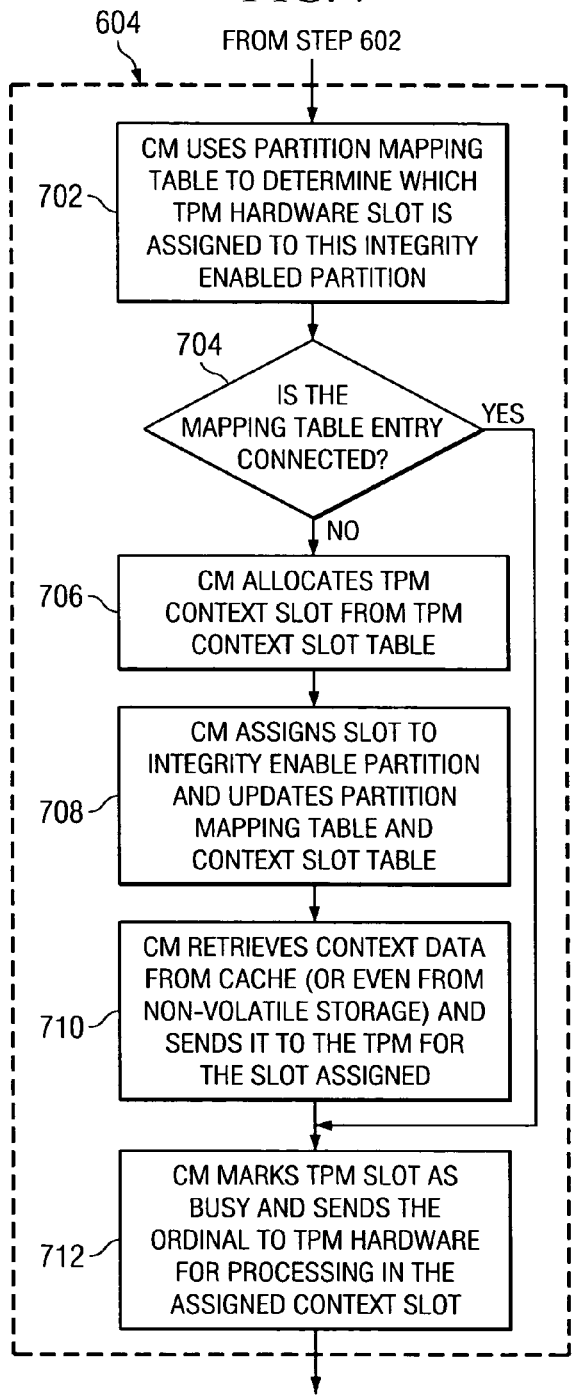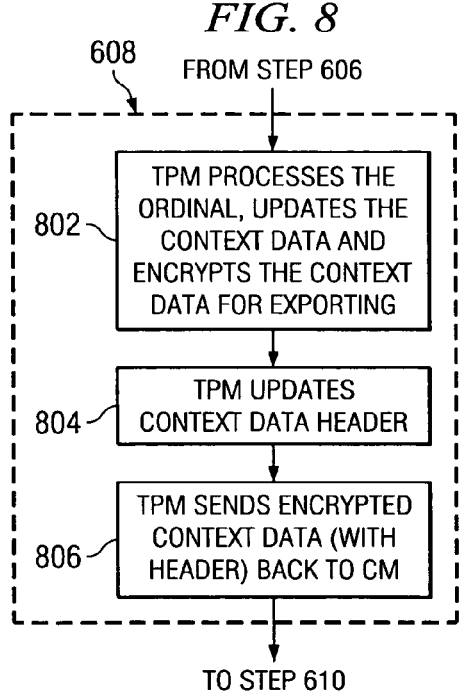

PROTOCOL FOR TRUSTED PLATFORM MODULE RECOVERY THROUGH CONTEXT CHECKPOINTING

BACKGROUND OF THE INVENTION

1. Field of the Invention

The present invention relates to an improved data processing system and, in particular, to a computer implemented method, data processing system, and computer program product in an environment designed to use a hardware trusted platform module (TPM) to enable partition context checkpointing that comprises the capture of context state information and use of the captured information to restore the state of partition context in the event of system or device failure.

2. Description of the Related Art

Most data processing systems contain sensitive data and sensitive operations that need to be protected. For example, the integrity of configuration information needs to be protected from illegitimate modification, while other information, such as a password file, needs to be protected from illegitimate disclosure. As another example, a data processing system needs to be able to reliably identify itself to other data processing systems.

An operator of a given data processing system may employ many different types of security mechanisms to protect the data processing system. For example, the operating system on the data processing system may provide various software mechanisms to protect sensitive data, such as various authentication and authorization schemes, while certain hardware devices and software applications may rely upon hardware mechanisms to protect sensitive data, such as hardware security tokens and biometric sensor devices.

The integrity of a data processing system's data and its operations, however, centers around the issue of trust. A data processing system's data and operations can be verified or accepted by another entity if that entity has some manner for establishing trust with the data processing system with respect to particular data items or particular operations.

Hence, the ability to protect a data processing system is limited by the manner in which trust is created or rooted within the data processing system. To address the issues of protecting data processing systems, a consortium of companies has formed the Trusted Computing Group (TCG) to develop and to promulgate open standards and specifications for trusted computing. According to the specifications of the Trusted Computing Group, trust within a given data processing system or trust between a data processing system and another entity is based on the existence of a hardware or software component within the data processing system that has been termed the trusted platform module (TPM).

A trusted platform enables an entity to determine the state of the software environment in that platform and to seal data to a particular software environment in that platform. The entity deduces whether the state of the computing environment in that platform is acceptable before performing a transaction with that platform. To enable this, the trusted platform provides integrity metrics, also known as integrity measurements, to the entity that reflect the integrity of the software state of the trusted platform. The integrity measurements require a root of trust within the computing platform. In order for a system to be a trusted platform, the integrity measurements must be taken from the Core Root of Trust for Measurements and extended through the initial program load (IPL) process up to the point at which the operating system is initialized.

A trusted platform module has been generally described in a platform-independent manner, but platform-specific descriptions have been created for certain classes of systems, such as personal computers (PCs). Existing hardware for trusted computing has focused on implementations for a single hardware trusted platform module for a single system. This situation is sufficient for simple servers and PCs, which tend to be relatively low-performance computers that meet the needs of stand-alone computational environments or client-side processing environments.

High-performance servers, though, support partitionable, multithreaded environments that may need access to a trusted platform module on multiple threads simultaneously. This type of environment allocates, or partitions, physical resources to each of the supported multiple partitions. In addition, each partition can be thought of as a separate logical computer system that can execute its own operating system and applications. The operating system executed by one partition may be different from the operating systems being executed by the other partitions.

One hardware TPM is designed to provide support for a single, non-partitionable computer system. Thus, existing systems utilize a single hardware TPM to provide trust for the entire single system. These systems, however, were not partitionable environments. A problem then arises as to how to provide support for a partitionable environment which includes multiple partitions which each act as separate computer systems.

In systems which use only a single hardware TPM to provide trust for the entire system, a problem can arise when that single hardware TPM fails to perform properly. When the single hardware TPM malfunctions, no trust services can be provided anywhere in the system until that hardware TPM is serviced or replaced.

Therefore, it would be advantageous to have a mechanism in a partitionable environment which enables recovery of a partition context, comprising the partition's TPM runtime state and persistent state information, in the event of a partition or hardware device failure.

SUMMARY OF THE INVENTION

Embodiments of the present invention provide a computer implemented method, data processing system, and computer program product for recovering a partition context in the event of a system or hardware device failure. A trusted platform module input/output host partition (TMPIOP) receives a command from a partition to modify context data in a trusted platform module hardware device. The TMPIOP provides an encrypted copy of the context data and the command to the trusted platform module hardware device, wherein the trusted platform module hardware device processes the command and updates the context data. Responsive to the trusted platform module hardware device having successfully processed the command, the TMPIOP receives the updated context data from the trusted platform module hardware device and stores the updated context data received in encrypted form in a context data cache or a non-volatile storage off-board the trusted platform module hardware device. If the trusted platform module hardware device fails to successfully process the command, the TMPIOP uses a last valid copy of the context data to retry processing of the command on a different trusted platform module hardware device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart describing the context manager ordinal processing in FIG. 6 according to an illustrative embodiment of the present invention;

FIG. 8 is a flowchart describing the trusted platform module ordinal processing in FIG. 6 according to an illustrative embodiment of the present invention;

DETAILED DESCRIPTION OF THE PREFERRED EMBODIMENT

Figure 1A:
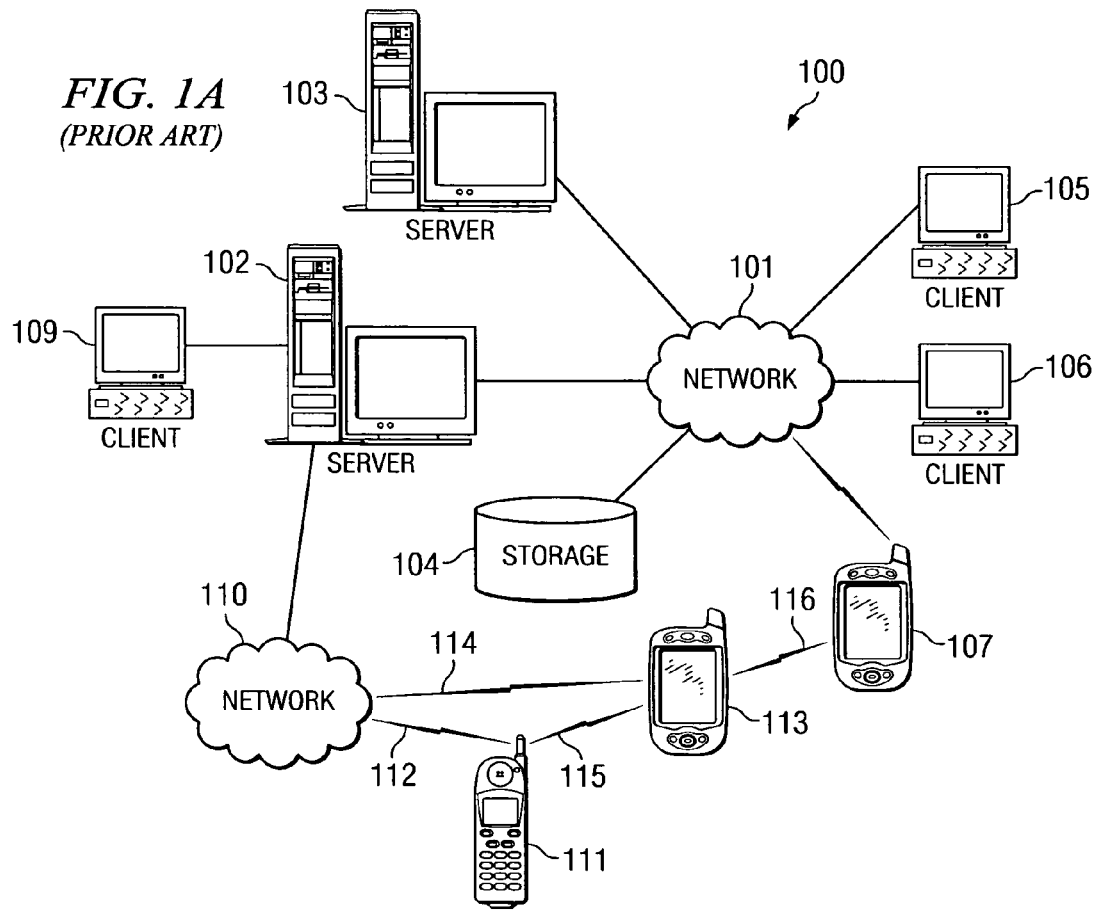
FIG. 1A depicts a typical network of data processing systems, each of which may be used to implement an illustrative embodiment of the present invention.

As previously mentioned, the Trusted Computing Group (TCG) is a consortium of companies that have developed and promulgated open standards and specifications for trusted computing. According to the specifications of the Trusted Computing Group, trust within a given data processing system or trust between a data processing system and another entity is based on the existence of a hardware or software component within the data processing system that has been termed the trusted platform module (TPM).

After and during the boot process, a particular integrity enabled partition may need to access the hardware TPM through the particular partition's logical TPM by issuing regular TPM ordinals, or TPM commands, as defined by the TCG. In addition, this invention makes use of the TPM context management ordinals on top of the TCG defined commands. These ordinals are TPM-defined commands that are used to manage the TPM context on the hardware TPM and include CreateContext, LoadContext, DeleteContext, and RestoreContext. When a command is issued from a partition, a context manager in the logical TPM retrieves the encrypted context data from the context cache, and copies the context into the hardware TPM hardware. The context manager is responsible for traffic routing and maintaining associations between an integrity enabled partition and its assigned context slot within the TPM hardware. The context data comprises the persistent and runtime context of each integrity enabled partition. The hardware TPM also has the context encryption key, which it uses to decrypt the context data. After decrypting the context data, the hardware TPM executes the command and updates the context. The updated context is then encrypted again with the context encryption key and returned to the context manager. The context manager then returns the context data to the context cache and places the persistent context portion into non-volatile system backup storage area.

The last valid copy of the partition context data is retained by the context manager as a checkpointed state until the ordinal processing in a TPM hardware finally succeeds and returns with an updated version of the context data. After the updated context data has been made persistent (when required by nature of the update), the ordinal transaction is completed by swapping the updated context data with the last valid copy and creating a new checkpoint state.

In this manner, the mechanism of the present invention provides a method for checkpointing if either the TPM device or the system fails. Failure of the integrity enabled partition or the integrity enabled application is also included since this failure is a subset of a system failure. The context information in either the context data cache or the backup storage location may be used to restore the persistent context of a failed integrity enabled partition, migrate an integrity enabled partition from one TPM device to another and restore its integrity state using checkpoint data, or restore the context when a partition is migrated between central electronic complexes (CECs), or physical machines with associated storage, memory and device connections. The mechanism of the present invention also provides a high availability of TPM ordinal processing. When used in combination with suitable redundant TPM hardware which is also concurrently maintainable (i.e., failing hardware is replaced while the system is running), TPM ordinal processing can be made failsafe to a very high degree.

With reference now to the figures, FIG. 1A depicts a network of data processing systems, each of which may be used to implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-106 also are connected to network 101. Clients 105-106 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

Figure 1B:
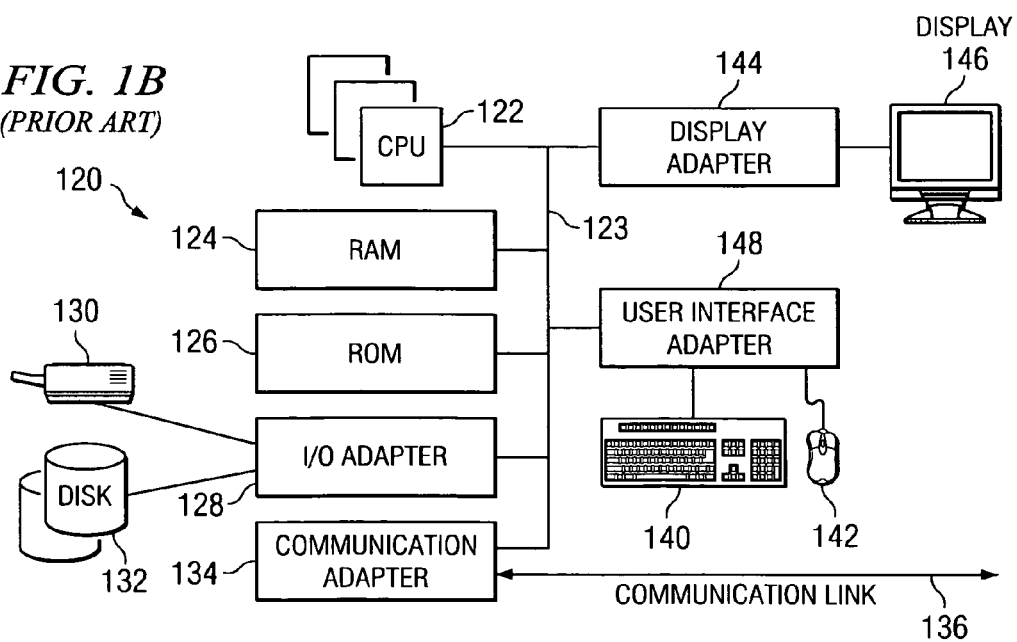
FIG. 1B depicts a typical computer architecture in which an illustrative embodiment of the present invention may be implemented.

FIG. 1B depicts a computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

Figure 1C:
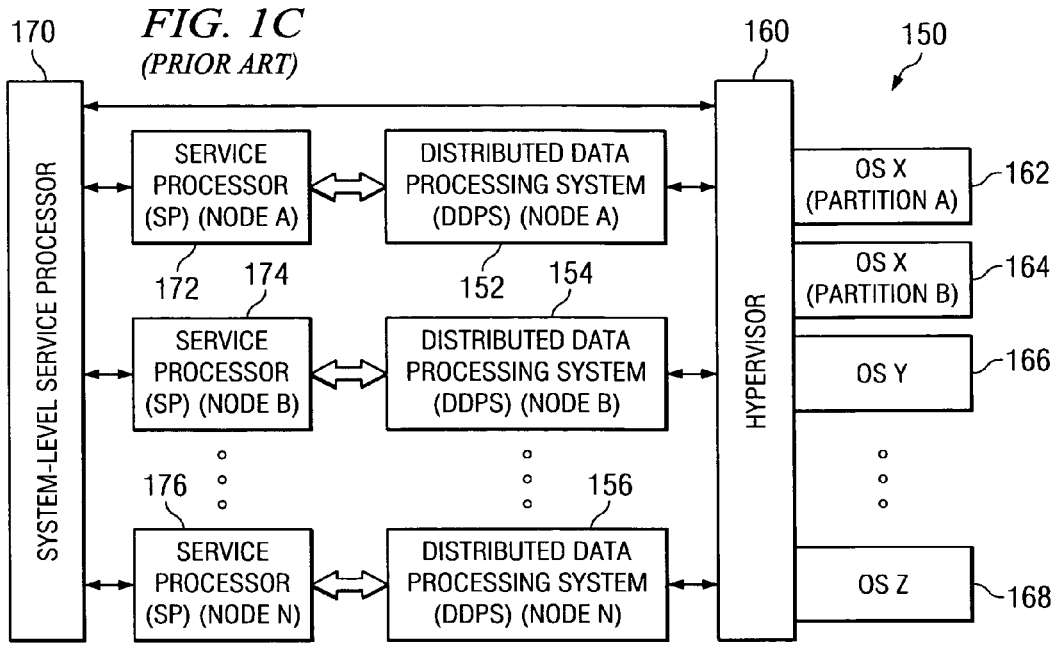
FIG. 1C depicts a block diagram that shows an example of a known distributed data processing system.

FIG. 1C depicts an example of a prior art distributed data processing system. Distributed data processing system 150 contains multiple nodes 152-156, each of which may represent a single-processor or multi-processor device or card connected to a communication switch or a network; nodes 152-156 may be implemented as central electronic complex (CEC) units. Hypervisor 160 supports multiple instances of one or more operating systems and/or operating system partitions 162-168 on the shared computational resources of the distributed data processing nodes of system 150. Hypervisor 160 communicates with system-level service processor 170, which is responsible for booting system 150 and for monitoring the availability of the shared resources. Each distributed data processing node is associated with a service processor, e.g., service processors 172-176, each of which is responsible for booting its associated node and for assisting system-level service processor 170 in monitoring each of the nodes; a service processor may be associated with a node through a variety of physical connections to its associated node, e.g., the service processor's hardware card may attach to a PCI bus. It should be noted that each node may have a plurality of service processors, although only one service processor would be responsible for booting its associated node.

The present invention could be implemented on a variety of hardware platforms and computational environments; FIG. 1A, FIG. 1B, and FIG. 1C are intended as examples of a heterogeneous computing environment and not as architectural limitations for the present invention.

In addition to being able to be implemented on a variety of hardware platforms and computational environments, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to trusted computing platforms. Before describing the present invention in more detail, though, some background information about trusted computing platforms is provided with reference to FIG. 2 for evaluating the operational efficiencies and other advantages of the present invention. Although the present invention may be implemented in conjunction with a variety of trusted computing platforms, possibly in accordance with one or more standards, the examples of the present invention hereinbelow employ the terminology and examples from the standards and/or specifications that have been promulgated by the Trusted Computing Group (TCG); it should be noted, though, that the examples are not meant to imply architectural, functional, nor definitional limitations with respect to embodiments of the present invention.

Figure 2:
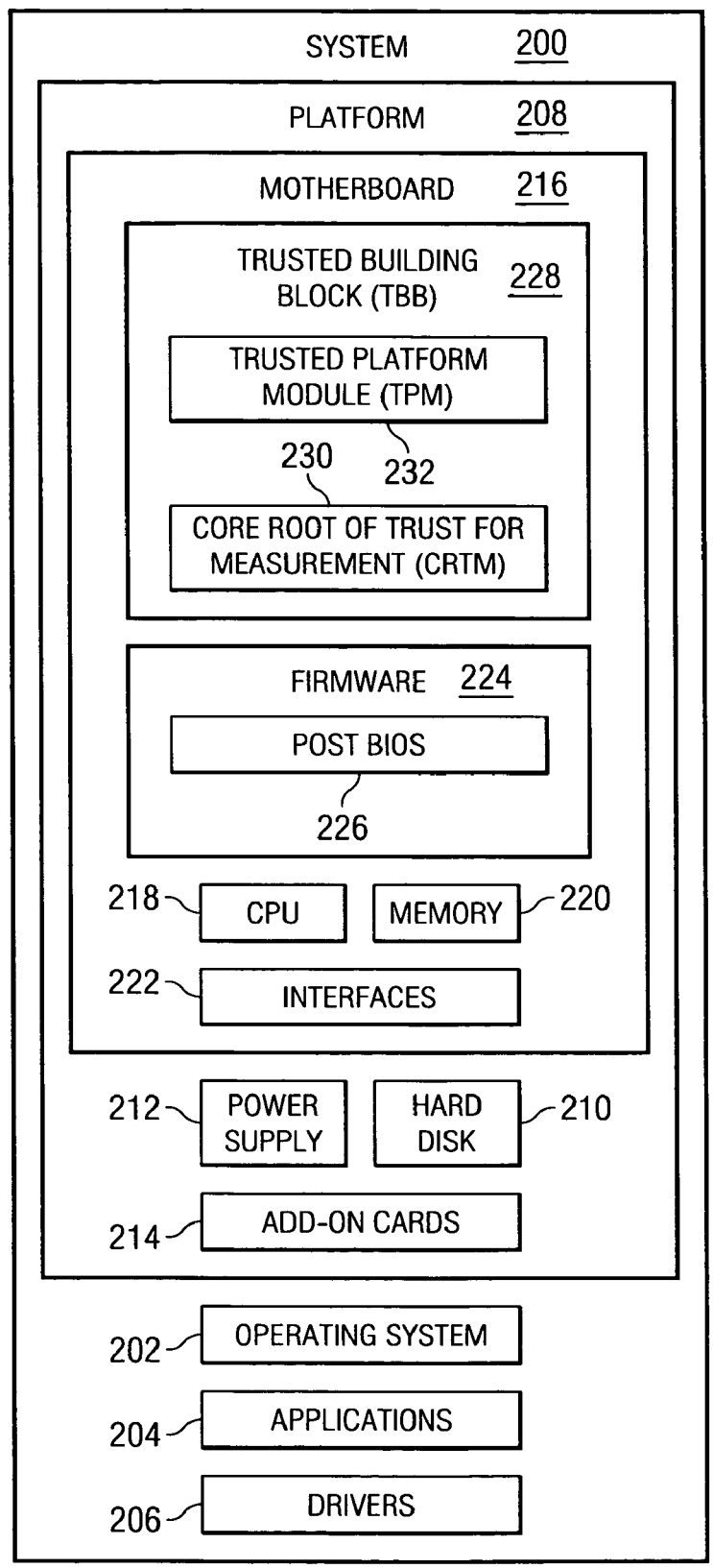
FIG. 2 depicts a block diagram that shows a modified trusted platform architecture in accordance with an illustrative embodiment the present invention.

FIG. 2 depicts a trusted platform module that has been modified according to the present invention. Trusted platform architectures may be implemented for particular computational environments or for particular classes of devices. Except as noted below with regard to the present invention, the remaining components of the TPM operate in accordance with the TCG's PC-specific implementation specification.

System 200 supports execution of software components, such as operating system 202, applications 204, and drivers 206, on its platform 208. The software components may be received through a network, such as network 101 that is shown in FIG. 1A, or they may be stored, e.g., on hard disk 210. Platform 208 receives electrical power from power supply 212 for executing the software components on add-on cards 214 and motherboard 216, which includes typical components for executing software, such as CPU 218 and memory 220, although motherboard 216 may include multiple CPUs. Interfaces 222 connect motherboard 216 to other hardware components within system 200, and firmware 224 contains POST BIOS (power-on self-test basic input/output system) 226.

Motherboard 216 also comprises trusted building block (TBB) 228; motherboard 216 is supplied by a manufacturer with TBB 228 and other components physically or logically attached and supplied by the manufacturer. TBB 228 comprises the combination of the core root of trust for measurement (CRTM) component 230, the trusted platform module (TPM) 232, the connection of the CRTM to motherboard 216, and the connection of the TPM to motherboard 216.

TPM 232 is explained in more detail with respect to FIG. 3 hereinbelow. CRTM 230 is an immutable portion of the platform's initialization code that executes upon a platform reset; the platform's execution must begin at the CRTM upon any platform reset event. In this manner, the trust in the platform is based on the CRTM and the behavior of the TPM, and the trust in all measurements is based on the integrity of the CRTM. In the example that is shown in FIG. 2, the BIOS may be assumed to include a BIOS Boot Block and POST BIOS 226; each of these are independent components that can be updated independent of each other, wherein the manufacturer must control the update, modification, and maintenance of the BIOS Boot Block, but a third party supplier may update, modify, or maintain the POST BIOS component. In the example that is shown in FIG. 2, the CRTM may be assumed to be the BIOS Boot Block, and the POST BIOS is a measured component of the chain of trust. Alternatively, the CRTM may comprise the entire BIOS.

Figure 3:
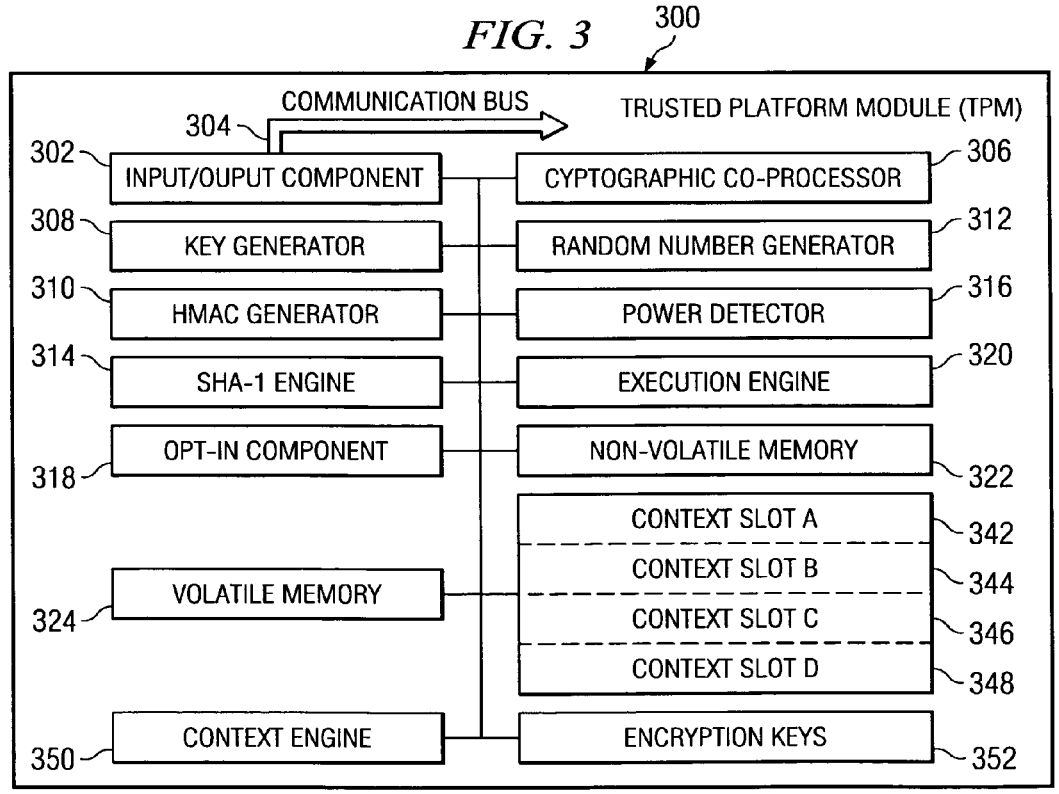
FIG. 3 depicts a block diagram that shows a modified trusted platform module (TPM) that includes some of the major components of a typical TPM according to Trusted Computing Group (TCG) specifications in addition to context swapping hardware according to an illustrative embodiment of the present invention.

FIG. 3 depicts a block diagram that illustrates a modified trusted platform module (TPM) that includes some of the major components of a typical TPM according to Trusted Computing Group (TCG) specifications in addition to context swapping hardware according to the present invention. Trusted platform module 300 comprises input/output component 302, which manages information flow over communications bus 304 by performing appropriate protocol encoding/decoding operations and routing of messages to appropriate components. Cryptographic co-processor 306 performs cryptographic operations within a trusted platform module. Key generator 308 creates symmetric keys and RSA asymmetric cryptographic key pairs. HMAC engine 310 performs HMAC (Keyed-Hashing for Message Authentication) calculations, whereby message authentication codes are computed using secret keys as integrity checks to validate information transmitted between two parties, e.g., in accordance with Krawczyk et al., "HMAC: Keyed-Hashing for Message Authentication", Request for Comments (RFC) 2104, Internet Engineering Task Force (IETF), February 1997.

Random number generator 312 acts as a source of randomness for the computation of various values, such as nonces, keys, or other values. SHA-1 engine 314 implements the SHA-1 hash algorithm. Power detector 316 manages the power states of a trusted platform module in association with the power states of the platform. Opt-in component 318 maintains the state of persistent and volatile flags and enforces semantics associated with those flags such that the trusted platform module may be enabled and disabled. Execution engine 320 runs program code to execute commands that the trust platform module receives through input/output component 302. Non-volatile memory 322 stores persistent identity and state associated with the trusted platform module; the non-volatile memory may store static data items but is also available for storing dynamic data items by entities that are authorized by the trusted platform module owner, whereas volatile memory 324 stores dynamic data items.

TPM 300 also includes multiple context slots, such as context slots 342, 344, 346, and 348. One context may be stored in each context slot at a time. A context includes the TPM state data and runtime TPM state that are associated with one partition. When a partition needs to use TPM 300, that partition's context must currently be stored in TPM 300 in one of its context slots.

A context engine 350 may be implemented in hardware as part of TPM 300, or may be implemented in hardware or software elsewhere in the data processing system that includes TPM 300. Context engine 350 executes the processes described below to store a partition's context in a context slot and to swap contexts into and out of the appropriate context slot.

Encryption keys 352 are stored within TPM 300. Various encryption keys may be utilized by TPM 300 in order to authenticate another device and/or to communicate with another device. Although encryption keys 352 are depicted separately from the other components of the TPM, the various encryption keys will typically be stored in non-volatile memory 322.

Figure 4:
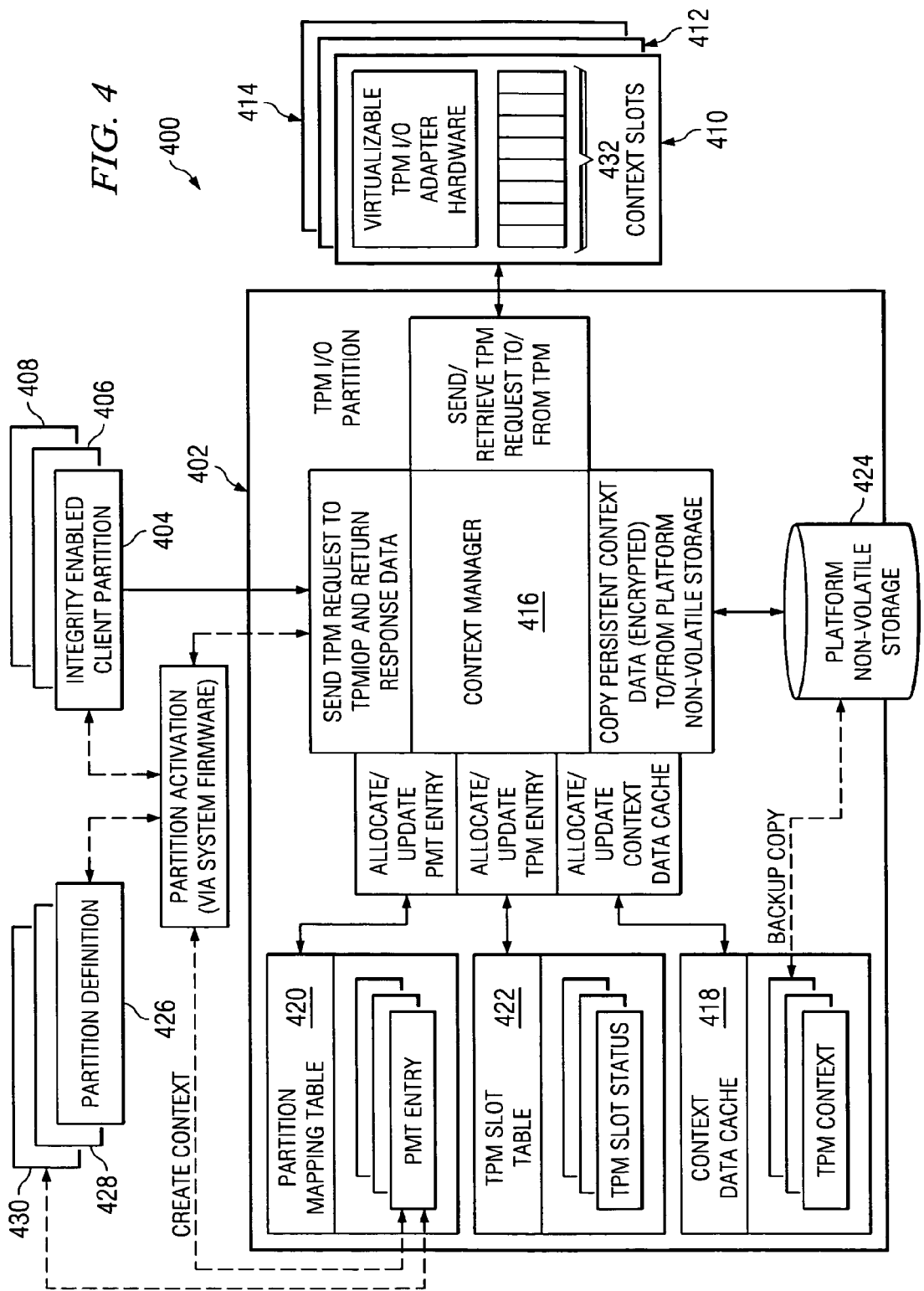
FIG. 4 depicts a block diagram that shows a virtualized trusted platform module (TPM) environment that may be used to implement an illustrative embodiment of the present invention.

Turning next to FIG. 4, a block diagram that shows a virtualized trusted platform module (TPM) environment that may be used to implement an illustrative embodiment of the present invention is shown. While existing TPM chips only support a single instance of an integrity enabled system, the mechanism of the present invention as illustrated in FIG. 4 allows an encrypted integrity enabled partition context to be stored off-board the physical TPM hardware. The integrity enabled partition context is maintained and managed by a trusted context manager.

In particular, data processing system 400 contains a virtualized TPM environment, which includes TPM I/O hosting partition (TPMIOP) 402 that supports multiple, independent, virtualizable TPM hardware devices on the same computing platform. TPMIOP 402 is the hosting layer between the integrity enabled client partitions, such as partitions 404, 406, and 408, and a plurality of physical TPM hardware devices, such as TPM hardware devices 410, 412, and 414 on the same computing platform. TPM hardware devices 410-414 are assigned to the same TPM hosting partition (TPMIOP 402). Each integrity enabled client partition uses TPMIOP 402 to route data and commands to the TPM hardware devices.

TPMIOP 402 owns the TPM hardware devices and manages TPM traffic among all of the integrity enabled partitions. TPMIOP 402 comprises context manager 416, context data cache 418, partition mapping table 420, and TPM slot table 422. Context manager 416 is responsible for traffic routing and maintaining associations between an integrity enabled partition and its assigned context slot within the TPM hardware. To manage this association data, the context manager maintains a context data cache, such as context data cache 418. Context data cache 418 is a dedicated portion of TPMIOP memory space that maintains the actual persistent and runtime context of each integrity enabled partition. When off-board the TPM device (e.g., in context data cache 418), the context data is always stored in encrypted form. Context manager 416 may also use platform non-volatile storage 424 (e.g., physical disk) to retain a protected backup copy of the context data cache. This backup data may be used to restore the context data after partition re-activation, power down, or system failures.

Partition mapping table 420 is used by the context manager to record the TPM hardware context slots which have been assigned or connected to a partition. In this manner, the context manager may keep track of the allocation of the context data for each integrity enabled partition. Each entry in partition mapping table 420 includes links to the context cache entries and persistent context data (e.g., last valid, in process) for each assigned TPM hardware context slot. As context manager 416 retains two copies of context data ('in process' and 'last valid') for each integrity enabled partition, after successful completion of an ordinal processing, the context update of the partition mapping table may be performed by switching the 'in process' state links to 'last valid' and invalidating the previous 'last valid' state links in the partition mapping table. The persistent context information is maintained within platform persistent storage, such as platform non-volatile storage 424. A partition definition specifies the partition bindings to the partition mapping table. Partition definitions 426-430 may be stored in non-volatile memory, such as platform non-volatile storage 424. Partition mapping table 420 is described in further detail in FIG. 5 below.

TPM context slot table 422 is used to maintain the status (e.g., assigned, busy, error, etc.) for each TPM context slot in the TPM hardware.

Virtualizable TPM hardware devices 410-414 comprise a number of context slots within each device. Each integrity enabled partition 404-408 is cryptographically bound to its context data via a cryptographic link between the partition definition and the (encrypted) context data, which is generated when the partition is booted for the first time when also the context data is initialized by the TPM hardware.

TPM hardware devices 410-414 are configured to share the same context encryption key such that each device may process context data created by any other TPM device on the platform. TPM hardware context slots, such as context slots 432, are idle until an integrity enabled partition issues a TPM context management ordinal to a particular TPM hardware device. As previously mentioned, the TPM context management ordinals are TPM-defined commands, such as CreateContext, LoadContext, DeleteContext, and RestoreContext, which modify the TPM context. Upon execution of such a command, context manager 416 uses partition mapping table 420 to identify the status of the TPM context slot from TPM context slot table 422 and retrieve the context data associated with the particular TPM context slot from context data cache 418. If the ordinal is 'CreateContext', the context data will be created by the TPM initially and returned as result of the ordinal. In all other cases, context manager 416 provides an encrypted copy of the context to the physical TPM hardware device if this particular context is not already present in one of the context slots within the TPM hardware. The TPM hardware device decrypts the context data using the context encryption key, executes the command, and updates the context in the appropriate context slot. The updated context is then encrypted again with the context encryption key and returned to context manager 416. Context manager 416 returns the context data to context data cache 418 and updates the appropriate links in partition mapping table 420 and context to reflect the successful transaction. If any change is made to the persistent part of the context data, context manager 416 pushes the encrypted copy of the persistent context and control information from the partition mapping table entry in platform non-volatile storage 424.

Once the context is made persistent by storing an encrypted copy in platform non-volatile storage 424, the transaction is completed. Storing the context off-board the TPM hardware allows recovery from various failures at any point during the ordinal processing. For example, in a failure of TPM hardware, the ordinals may be restarted by the context manager on a different TPM hardware device using the context cache information. In a critical failure of the context manager, the context manager may be restarted based on persistent context information stored in platform non-volatile storage 424.

Figure 5:
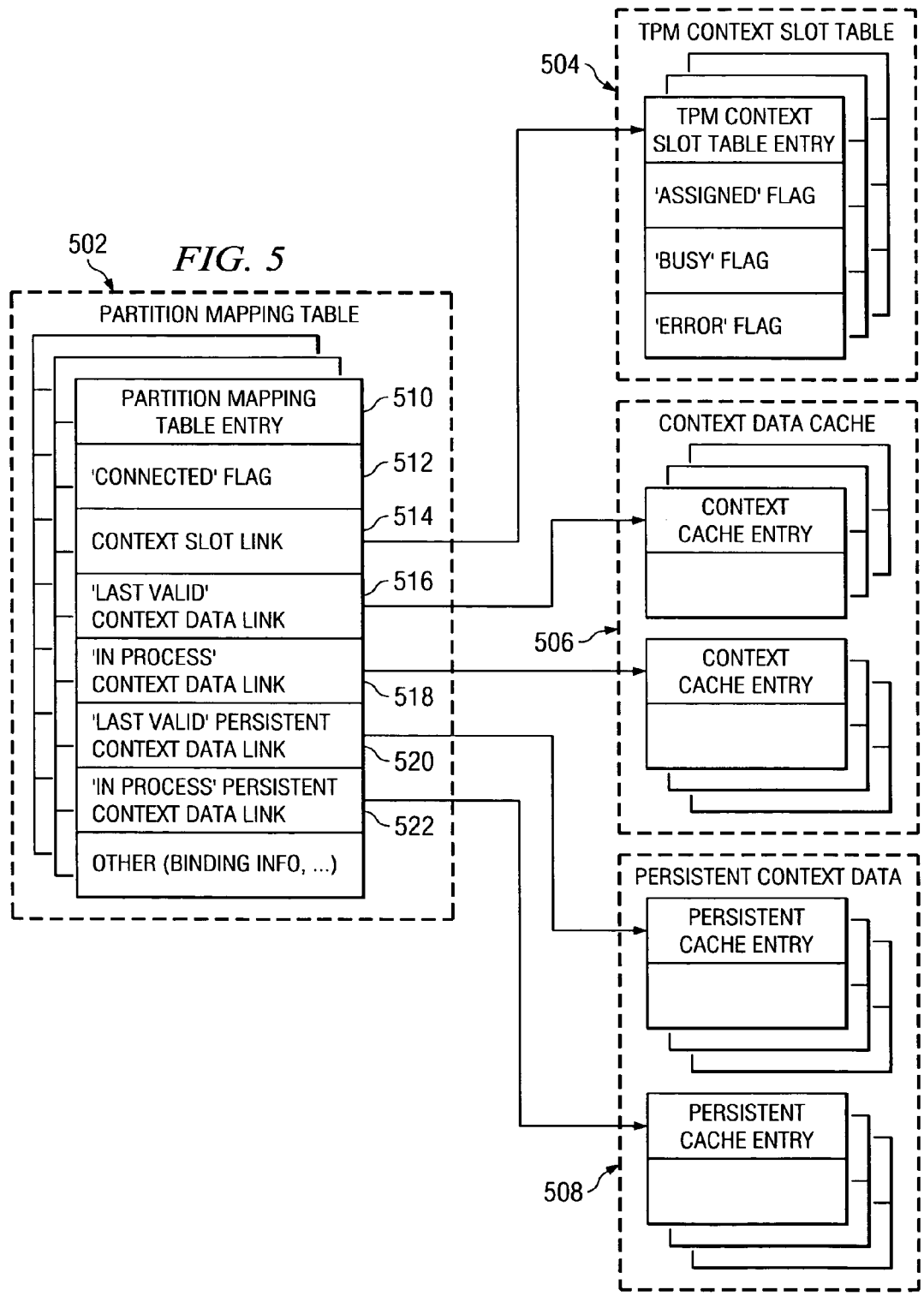
FIG. 5 depicts a block diagram of the trusted platform module input/output partition (TPMIOP) context manager tables shown in FIG. 4.

FIG. 5 depicts a block diagram that further illustrates TPMIOP context manager tables shown in FIG. 4. As previously mentioned, context manager 416 in FIG. 4 manages the connections between the integrity enabled partitions and their assigned context slots within the TPM hardware using partition mapping table 502, TPM context slot table 504, context data cache 506, and persistent context data 508, which is stored in platform non-volatile storage.

Partition mapping table 502 records the TPM context slots connected to a partition. For example, partition mapping table entry 510 comprises various information, including connected flag 512 which specifies the TPM context slots that have been assigned or connected to a partition. Partition mapping table entry 510 also includes a link 514 to TPM context slot table 504. Each entry in TPM context slot table 504 includes flags that indicate the status of the particular TPM context slot in question, such as 'assigned', 'busy', or 'error'. A TPM context slot is flagged as 'assigned' when a partition is assigned to the slot. A TPM context slot is flagged as 'busy' when the slot is currently being processed. The context slot is flagged as 'error' when the slot is in error and not available.

Partition mapping table entry 510 also includes links 516, 518 to context data cache 506. The links to context data cache 506 point to a 'last valid' context data entry and an 'in process' context data entry for the partition. Likewise, partition mapping table entry 510 also includes links 520 and 522 to persistent context data 508 stored in non-volatile storage. The links to persistent context data 508 point to a 'last valid' persistent context data entry and an 'in process' persistent context data entry for the partition.

Figure 6:
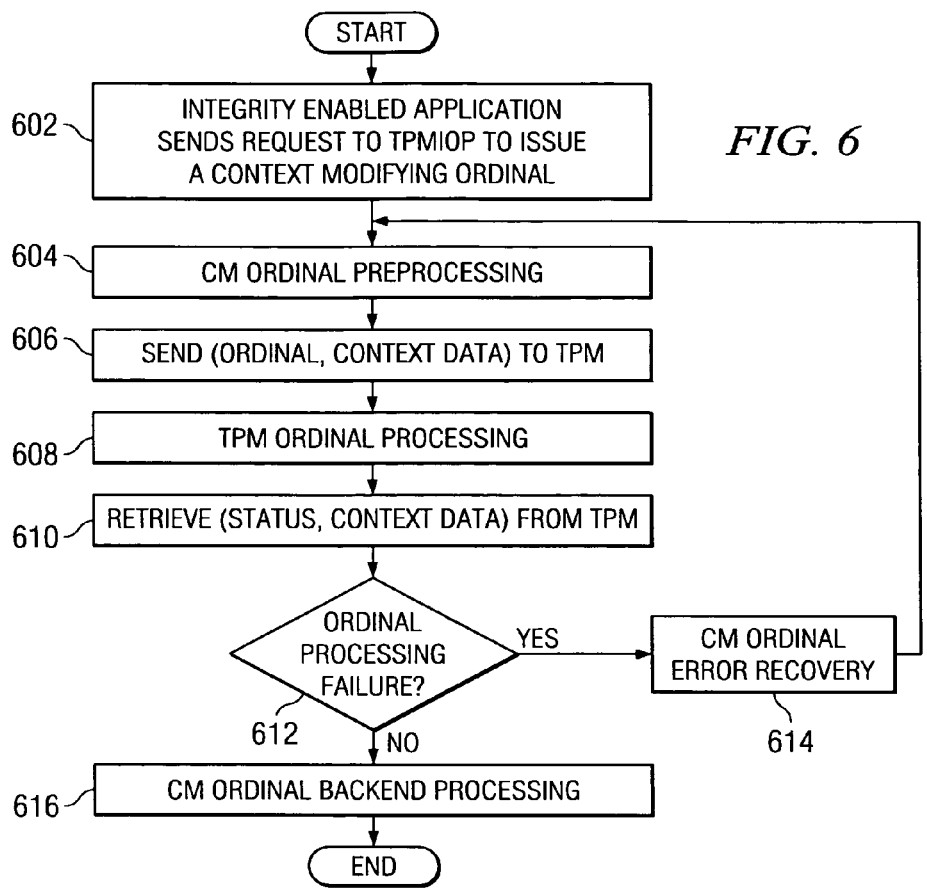
FIG. 6 is a flowchart of a high level process for enabling checkpointing for recovery of partition context data in the event of a device or partition failure according to an illustrative embodiment of the present invention.

FIG. 6 is a flowchart of a high level process for enabling checkpointing for recovery of partition context data in the event of a device or partition failure according to an illustrative embodiment of the present invention. The high level process described in FIG. 6 may be implemented in a data processing system, such as data processing system 400 in FIG. 4.

The process begins when an integrity enabled application sends a request to the TPMIOP to issue a context-modifying ordinal to a particular TPM hardware device (step 602). Upon receiving the request, the context manager in the TPMIOP preprocesses the request and retrieves context data from the context data cache (step 604). The context manager then sends the ordinal and the context data to the TPM hardware (step 606).

Upon receiving the ordinal and context data, the TPM hardware processes the information (step 608). Once the TPM processing is complete, the context manager retrieves the updated context data and status from the TPM hardware (step 610).

A determination is then made by the context manager whether a failure at any stage in the ordinal processing has occurred (step 612). If an ordinal processing failure is detected, an ordinal error recovery process is performed (step 614). The process then returns to step 604. If no ordinal processing failure is detected, the context manager performs a backend processing on the ordinal (step 616), with the process terminating thereafter.

FIG. 7 is a flowchart describing the context manager ordinal preprocessing in step 604 of FIG. 6 according to an illustrative embodiment of the present invention. When the TPMIOP receives a request from an integrity enabled application in the form of a context-modifying ordinal, the context manager of the TPMIOP uses the partition mapping table in the TPMIOP to determine which TPM hardware context slot is assigned to the integrity enabled partition (step 702). The context manager determines the assignment by locating an entry in the partition mapping table for the particular partition. The context manager then determines whether the partition entry found in the partition mapping table is already connected (assigned) to a TPM hardware context slot (step 704). A 'connected' mapping table entry is defined as having a TPM hardware context slot already assigned to the particular partition.

If the context manager determines that the mapping table entry is 'connected', the process skips to step 712, wherein the context manager marks the flag in the TPM slot in the TPM context slot table as 'busy' and sends the ordinal to the TPM hardware for processing in the assigned TPM hardware context slot.

Turning back to step 704, if the context manager determines that the partition mapping table entry is not 'connected', the context manager allocates a TPM context slot from the TPM context slot table (step 706). This step may include searching the TPM context slot table for an unassigned TPM hardware context slot, or alternatively, if an unassigned context slot is not found, assigning a TPM context slot already assigned to another partition (but not busy) to the partition. The context data for the other partition does not need to be preserved, since the last valid context data for that partition is retained by the context manager. The context manager then assigns the available context slot to the integrity enabled partition, and updates the partition mapping table and context slot table with this assignment (step 708). The context manager retrieves the context data associated with the partition mapping table entry from the context data cache or from the non-volatile storage and sends the context data to the TPM hardware for the context slot assigned (step 710). At this point, the TPM hardware receives the context data and decrypts it for processing. The context manager then marks the flag in the TPM slot in the TPM context slot table as 'busy' and sends the ordinal to the TPM hardware for processing in the assigned TPM hardware context slot (step 712).

FIG. 8 is a flowchart describing the TPM ordinal processing in step 608 of FIG. 6 according to an illustrative embodiment of the present invention. When the TPM hardware receives the context-modifying ordinal and context data from the context manager, the TPM hardware processes the ordinal, updates the context data in the corresponding TPM hardware context slot, the encrypts the updated context data for exporting (step 802). The TPM also updates the context data header (step 804). The context data header contains flags that are used to indicate whether the context has been modified, which part(s) of the context data has been modified (e.g., persistent or transient), and the status of the TPM ordinal processing (e.g., successful). The TPM hardware sends the encrypted context data with the updated header to the context manager (step 806).

Figure 9:
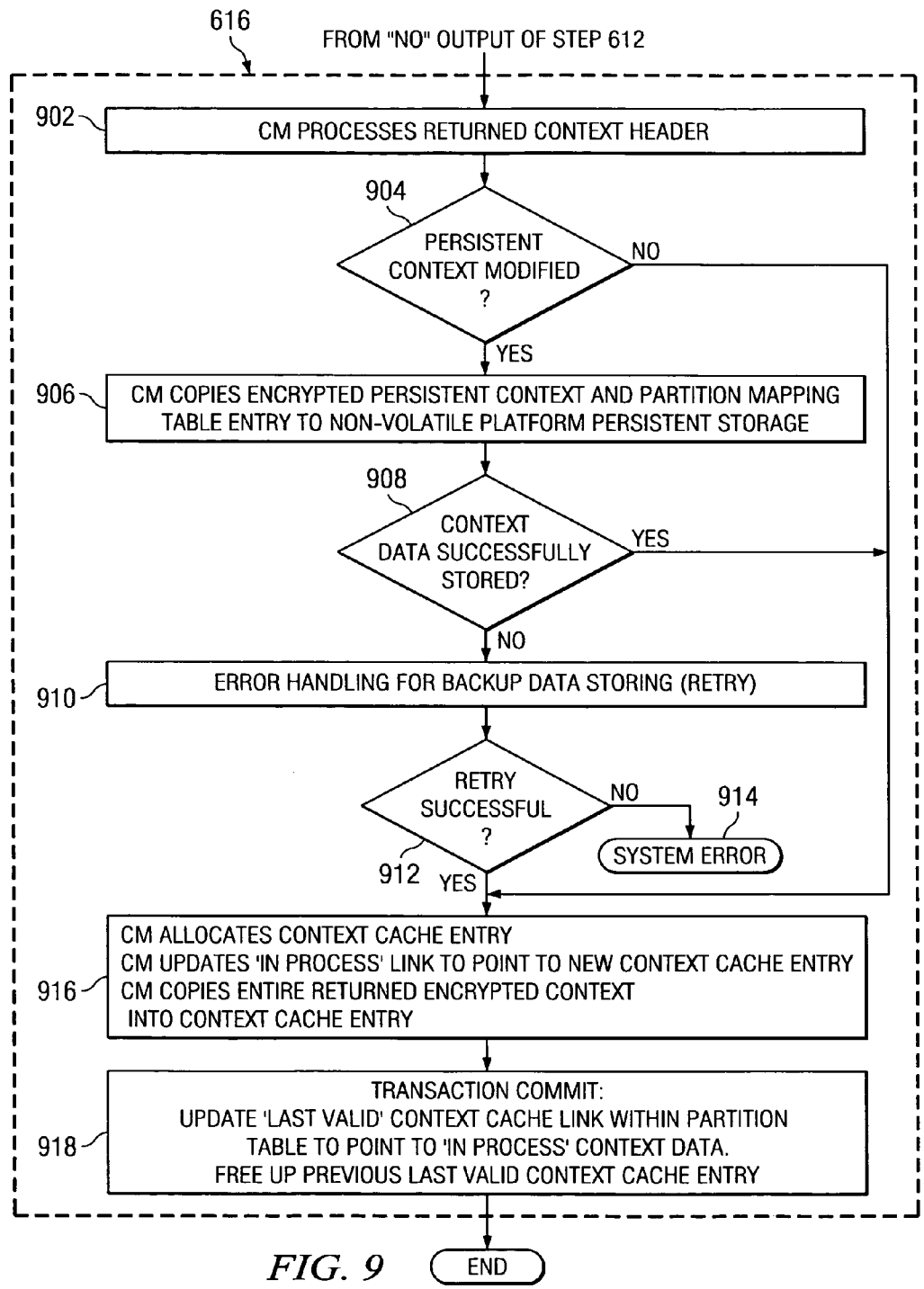
FIG. 9 is a flowchart describing the context manager back-end processing in FIG. 6 according to an illustrative embodiment of the present invention.

FIG. 9 is a flowchart describing the context manager backend processing according to an illustrative embodiment of the present invention. The context manager backend processing begins after the context manager determines in step 616 of FIG. 6 that no failure in the ordinal processing has occurred. In step 902, the context manager processes the context header information returned from the TPM hardware device, as described above in step 806 in FIG. 8. The context manager then determines whether the persistent context returned from the TPM hardware has been modified (step 904). This determination may be made by checking the context header for an indication that the modification flag is set for the persistent part of the context data. If the persistent context has been modified, the context manager copies the encrypted persistent context and partition mapping table entry to non-volatile platform persistent storage (step 906), such as NVRAM or physical disk.

The context manager then makes a determination whether the context data has been successfully stored in the non-volatile persistent storage (step 908). If the storage is unsuccessful, the context manager initiates error handling for backup data storing (i.e., retry of the storage operation) (step 910). A determination is then made as to whether the retry is successful (step 912). If the retry is unsuccessful, a system error is generated (step 914), and the process terminates thereafter.

If the persistent context was not modified in step 904, the context data was successfully stored in step 908, or the retry was successful in step 912, the process continues to step 916, wherein the context manager allocates a context cache entry in the context cache, updates the 'in process' link for the partition to point to a new context cache entry, and copies the entire returned encrypted context data into the context cache entry. At this point, the context manager may commit the transaction by updating the 'last valid' context cache link in the mapping partition table to point to the 'in process' context data, and free up the previous last valid context cache entry (step 918).

Thus, the successful completion of the overall transaction is reached after writing all updates of persistent context data to platform non-volatile storage. The successful transaction also includes the successful writing of control information from the partition mapping table entry to non-volatile storage as well.

Figure 10:
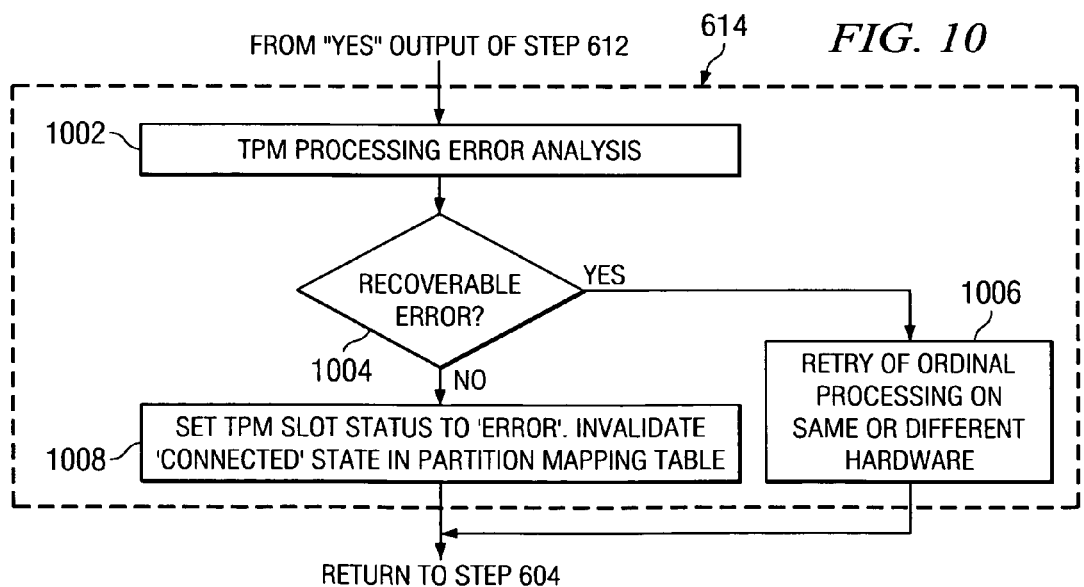
FIG. 10 is a flowchart describing the context manager ordinal error recovery in FIG. 6 according to an illustrative embodiment of the present invention.

FIG. 10 is a flowchart illustrating the context manager ordinal error recovery process according to an illustrative embodiment of the present invention. The context manager ordinal error recovery begins after the context manager determines in step 614 of FIG. 6 that a failure in the ordinal processing has occurred. At step 1002, the context manager begins the error processing analysis. The context manager determines whether the ordinal failure is a recoverable error (step 1004). If the failure is a recoverable error, a retry of the ordinal processing is initiated on the same or different TPM hardware device (step 1006). The context manager discards the 'in process' context information, selects a different TPM hardware for ordinal processing retry using the 'last valid' copy as the check-pointed state, and the process returns to step 604 in FIG. 6.

If the failure is not a recoverable error, the context manager sets the TPM slot status in the TPM context slot table to 'error' and invalidates the 'connected' state in the partition mapping table (step 1008) and returns to step 604 in FIG. 6.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any. tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for context checkpointing in a data processing system, the computer implemented method comprising:
    responsive to receiving a command from a partition to modify context data in a trusted platform module hardware device, providing an encrypted copy of the context data and the command to the trusted platform module hardware device by identifying a context slot in the trusted platform module hardware device assigned to the partition using a partition mapping table and sending the command to the assigned context slot in the trusted platform module hardware device for processing, wherein the trusted platform module hardware device processes the command and updates the context data;
    responsive to the trusted platform module hardware device having successfully processed the command, receiving the updated context data from the trusted platform module hardware device;
    storing the updated context data received in encrypted form from the trusted platform module hardware device in at least one of a context data cache or a non-volatile storage off-board the trusted platform module hardware device; and
    responsive to a failure of the trusted platform module hardware device to successfully process the command, using a last valid copy of the context data to retry processing of the command on a different trusted platform module hardware device.

2. The computer implemented method of claim 1, further comprising:
    if no context slot in the trusted platform module hardware device is assigned to the partition, allocating a context slot from a trusted platform module context slot table;
    assigning the allocated context slot to the partition by updating the partition mapping table and trusted platform module context slot table;
    retrieving the encrypted context data from one of the context data cache or the non-volatile storage; and
    sending the encrypted context data and the command to the trusted platform module hardware device.

3. The computer implemented method of claim 1, wherein processing of the command by the trusted platform module hardware device further comprises:
    receiving the encrypted context data at the trusted platform module hardware device;
    decrypting the encrypted context data;
    executing the command;
    updating the context data, wherein the updated context data includes a context data header;
    encrypting the updated context data using a context encryption key; and
    sending the encrypted updated context data to the trusted platform module input/output host partition.

4. The computer implemented method of claim 1, wherein receiving the updated context data from the trusted platform module hardware device further comprises:
    allocating a new entry in the context data cache for the updated context data;
    updating an in process link in a partition mapping table to point to the new entry;
    storing the update context data in the new entry;
    updating a last valid link in the partition mapping table to point to a previous in process entry in the context data cache; and
    releasing a previous last valid entry in the context data cache.

5. The computer implemented method of claim 4, further comprising:
    processing a context data header received in the updated context data to determine if a persistent context in the updated context data was modified; and
    if the persistent context was modified, storing the persistent context and associated partition mapping table entry in the non-volatile storage.

6. The computer implemented method of claim 1, wherein storing the updated context data in encrypted form includes replacing the last valid copy of the context data with the updated context data to create a new checkpoint state.

7. The computer implemented method of claim 1, wherein using the last valid copy of the context data further comprises:
    responsive to determining that the failure is a recoverable error, using a last valid link in a partition mapping table to identify the last valid copy of the context data in a context data cache to migrate the partition from a failed trusted platform module hardware device to another trusted platform module hardware device and restore a state of the partition using the last valid copy of the context data.

8. The computer implemented method of claim 1, wherein the context data comprises persistent and transient states of the partition.

9. The computer implemented method of claim 1, wherein the last valid copy of the context data used is recovered from one of the context data cache or the non-volatile storage to recover the context data.

10. The computer implemented method of claim 1, wherein the receiving, providing, placing, and using steps are implemented by a context management engine within a trusted platform module input/output host partition.

11. The computer implemented method of claim 3, wherein the context data header indicates whether the context data was modified, which parts of the context data were modified, and if processing of the command was successful.

12. The computer implemented method of claim 1, wherein the command is a context management ordinal for modifying the context data on the trusted platform module hardware device.

13. The computer implemented method of claim 10, wherein the context management ordinal is one of CreateContext, LoadContext, DeleteContext, and RestoreContext.

14. The computer implemented method of claim 1, wherein the partition is an integrity enabled partition.

15. A data processing system for performing context checkpointing, the data processing system comprising:
- a bus;
- a storage device connected to the bus, wherein the storage device contains computer usable code;
- at least one managed device connected to the bus;
- a communications unit connected to the bus; and
- a processing unit connected to the bus, wherein the processing unit executes the computer usable code to provide an encrypted copy of context data and a command to a trusted platform module hardware device in response to receiving the command from a partition to modify the context data in the trusted platform module hardware device by identifying a context slot in the trusted platform module hardware device assigned to the partition using a partition mapping table and sending the command to the assigned context slot in the trusted platform module hardware device for processing, wherein the trusted platform module hardware device processes the command and updates the context data, receive the updated context data from the trusted platform module hardware device in response to the trusted platform module hardware device having successfully processed the command, store the updated context data received in encrypted form from the trusted platform module hardware device in at least one of a context data cache or a non-volatile storage off-board the trusted platform module hardware device, and use a last valid copy of the context data to retry processing of the command on a different trusted platform module hardware device in response to a failure of the trusted platform module hardware device to successfully process the command.

16. A computer program product for performing context checkpointing, the computer program product comprising:
- a computer readable storage medium having computer usable program code stored thereon, the computer usable program code comprising:
- computer usable program code for providing an encrypted copy of context data and a command to a trusted platform module hardware device in response to receiving the command from a partition to modify the context data in the trusted platform module hardware device by identifying a context slot in the trusted platform module hardware device assigned to the partition using a partition mapping table and sending the command to the assigned context slot in the trusted platform module hardware device for processing, wherein the trusted platform module hardware device processes the command and updates the context data;
- computer usable program code for receiving the updated context data from the trusted platform module hardware device in response to the trusted platform module hardware device having successfully processed the command;
- computer usable program code for storing the updated context data received in encrypted form from the trusted platform module hardware device in at least one of a context data cache or a non-volatile storage off-board the trusted platform module hardware device; and
- computer usable program code for using a last valid copy of the context data to retry processing of the command on a different trusted platform module hardware device in response to a failure of the trusted platform module hardware device to successfully process the command.

17. The computer program product of claim 16, wherein the computer usable program code for storing the updated context data in encrypted form includes replacing the last valid copy of the context data with the updated context data to create a new checkpoint state.

18. The computer program product of claim 16, wherein the computer usable program code for using a last valid copy of the context data further comprises:
- computer usable program code for using a last valid link in a partition mapping table to identify the last valid copy of the context data in a context data cache to migrate the partition from a failed trusted platform module hardware device to another trusted platform module hardware device and restore a state of the partition using the last valid copy of the context data in response to determining that the failure is a recoverable error.

19. The computer program product of claim 16, wherein the last valid copy of the context data used is recovered from one of the context data cache or the non-volatile storage to recover the context data.

* * * * *

UNITED STATES PATENT AND TRADEMARK OFFICE
CERTIFICATE OF CORRECTION

PATENT NO. : 7,624,283 B2 Page 1 of 1
APPLICATION NO. : 11/352762
DATED : November 24, 2009
INVENTOR(S) : Bade et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 956 days.

Signed and Sealed this

Twenty-sixth Day of October, 2010

David J. Kappos
*Director of the United States Patent and Trademark Office*